(12) United States Patent
Cai

(10) Patent No.: US 8,401,577 B2
(45) Date of Patent: Mar. 19, 2013

(54) MESSAGE DELIVERY CONTROL BASED ON DESTINATION POINT CODES

(75) Inventor: Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 382 days.

(21) Appl. No.: 12/493,691

(22) Filed: Jun. 29, 2009

(65) Prior Publication Data

US 2010/0331001 A1 Dec. 30, 2010

(51) Int. Cl.
*H04W 4/00* (2009.01)
(52) U.S. Cl. ......... 455/466; 455/445; 370/229; 370/235
(58) Field of Classification Search ........................ None
See application file for complete search history.

(56) References Cited

U.S. PATENT DOCUMENTS

| 6,996,225 | B1 | 2/2006 | Bordonaro et al. | |
| 7,145,875 | B2 * | 12/2006 | Allison et al. | 370/230.1 |
| 7,761,105 | B2 * | 7/2010 | Harding | 455/466 |
| 2006/0215550 | A1 * | 9/2006 | Malhotra | 370/229 |

* cited by examiner

*Primary Examiner* — Willie J Daniel, Jr.
(74) *Attorney, Agent, or Firm* — Duft Bornsen & Fishman, LLP

(57) ABSTRACT

Systems and methods are disclosed for limiting text/multimedia message delivery based on destination point codes or other destination identifiers. A switching center in a mobile network monitors the amount of text/multimedia message traffic routed to destinations. If the message traffic routed to a destination exceeds a threshold, then the switching center generates a traffic message indicating traffic congestion for the destination, and transmits the traffic message to a message center. The message center processes the traffic message to identify a destination point code for the destination. The message center then adjusts delivery of text/multimedia messages toward the destination point code of the destination.

20 Claims, 8 Drawing Sheets

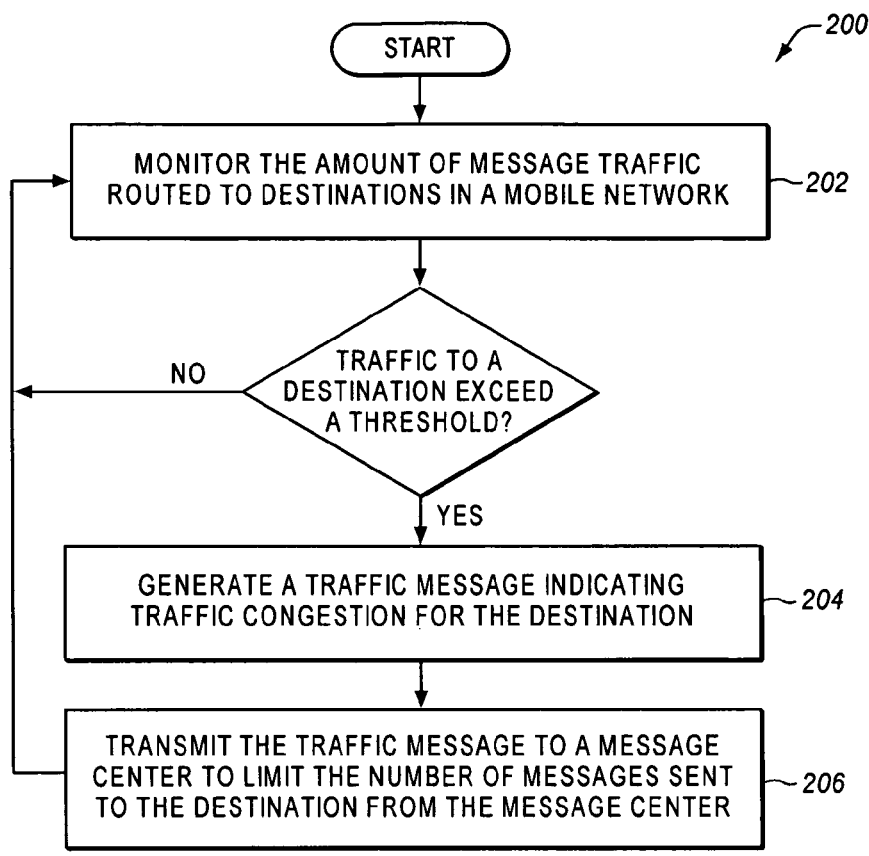
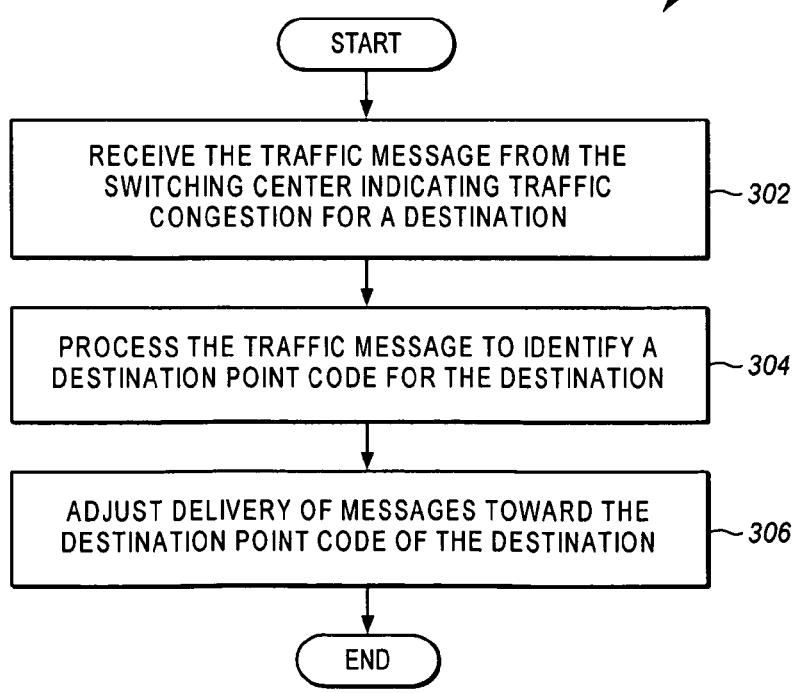

MESSAGE DELIVERY CONTROL BASED ON DESTINATION POINT CODES

BACKGROUND

1. Field of the Invention

The invention is related to the field of communications and, in particular, to delivery of messages.

2. Statement of the Problem

In many mobile networks, text and multimedia messaging has become a very popular mode of communication. One example of a text messaging service is Short Message Service (SMS), which is a communication protocol allowing the exchange of short text messages (i.e., 160 characters) between mobile devices. One example of a multimedia messaging service is Multimedia Message Service (MMS), which is a communication protocol allowing the exchange of multimedia messages (i.e., digital pictures, media clips, etc) between mobile devices. Often times, mobile users more frequently use text or multimedia messaging for communication than voice calls.

Text messages are transmitted over signaling channels of a mobile network, such as over SS7 channels. An SMS Center (SMSC) in the mobile network has a store-and-forward system for delivering text messages to their destinations. Upon initially receiving a text message, the store-and-forward system first stores (persistently) the text message, and then initiates a delivery attempt for the text message. If the first delivery attempt is unsuccessful, then the store-and-forward system enters a retry process. For the retry process, the network operator predefines a global retry configuration for all text messages. Thus, the store-and-forward system identifies the global retry configuration, and then attempts to deliver the text message to the destination according to the global retry configuration. For example, the global retry configuration may define that a maximum of three retry attempts should be made at an interval of thirty minutes. After the failed delivery of the text message, the store-and-forward system waits for thirty minutes and then initiates a retry attempt for the text message. If the first retry attempt is unsuccessful, then the store-and-forward system again waits for thirty minutes and initiates a second retry attempt. This process of retrying delivery occurs three times before the text message is discarded. A similar process occurs for multimedia messages (e.g., MMS) or other types of messages.

One problem encountered by network operators is that when the mobile network becomes congested, there may be a higher incident of failed deliveries for SMS messages. For example, where there is a large event, such as a New Years Eve celebration, a large amount of SMS traffic can overload a Mobile Switching Center (MSC), an SMSC, or other network elements. If an MSC shuts down due to the high traffic volume, many SMS messages may be lost.

To solve this problem, network operators may deploy more SMSCs or MSCs in a congested area to handle traffic congestion problems. However, this is an expensive solution to the congestion problem, especially considering that the traffic congestion could be temporary. Network operators may also control SMS message traffic by limiting the number of SMS messages that are sent by the SMSC. The presently-used methods control all SMS traffic delivered from the SMSC. For example, if message congestion is identified in one MSC, then the SMSC limits the number of SMS messages it delivers to the congested MSC and other MSCs in the mobile network. An SMSC may serve areas that have high SMS traffic congestion as well as areas that have no SMS traffic congestion. Unfortunately, the SMSC limits the number of SMS messages delivered to the areas that have no SMS traffic congestion, even when there is no need to do so.

SUMMARY

Embodiments described herein are able to control text or multimedia message delivery in a mobile network based on destination point codes or other destination identifiers. If congestion is identified for one or more destination point codes, then delivery of text/multimedia messages is adjusted toward these destination point codes. Because text/multimedia message delivery is limited on a per-destination basis, network operators can advantageously limit message delivery in areas experiencing congestion but maintain regular message delivery in areas that are not experiencing congestion.

In one embodiment, a mobile network includes a switching center, such as an MSC, that monitors the amount of message traffic routed to destinations in the mobile network. The destinations have associated destination point codes or destination identifiers. If the message traffic routed to a destination exceeds a threshold, then the switching center generates a traffic message indicating traffic congestion for the destination, and transmits the traffic message to a message center.

In another embodiment, the mobile network includes the message center, such as a SMSC, that stores rules defining how message delivery is limited to a destination point code. The message center receives the traffic message from the switching center indicating traffic congestion for a destination, and processes the traffic message to identify a destination point code (or other destination identifier) for the destination. The message center then adjusts delivery of text/multimedia messages toward the destination point code based on the rules. For example, the message center may queue a first delivery attempt of a message toward the destination point code. The message center may increase a retry interval for a message toward the destination point code. The message center may selectively deliver a percentage of messages toward the destination point code. Because the message center is able to adjust delivery of message based on destination point codes, network operators can advantageously limit message delivery in certain areas while maintain regular message delivery in other areas.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 2 is a flow chart illustrating a method of identifying traffic congestion per destination in an exemplary embodiment.

FIG. 3 is a flow chart illustrating a method of adjusting delivery of messages based on destination point codes in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
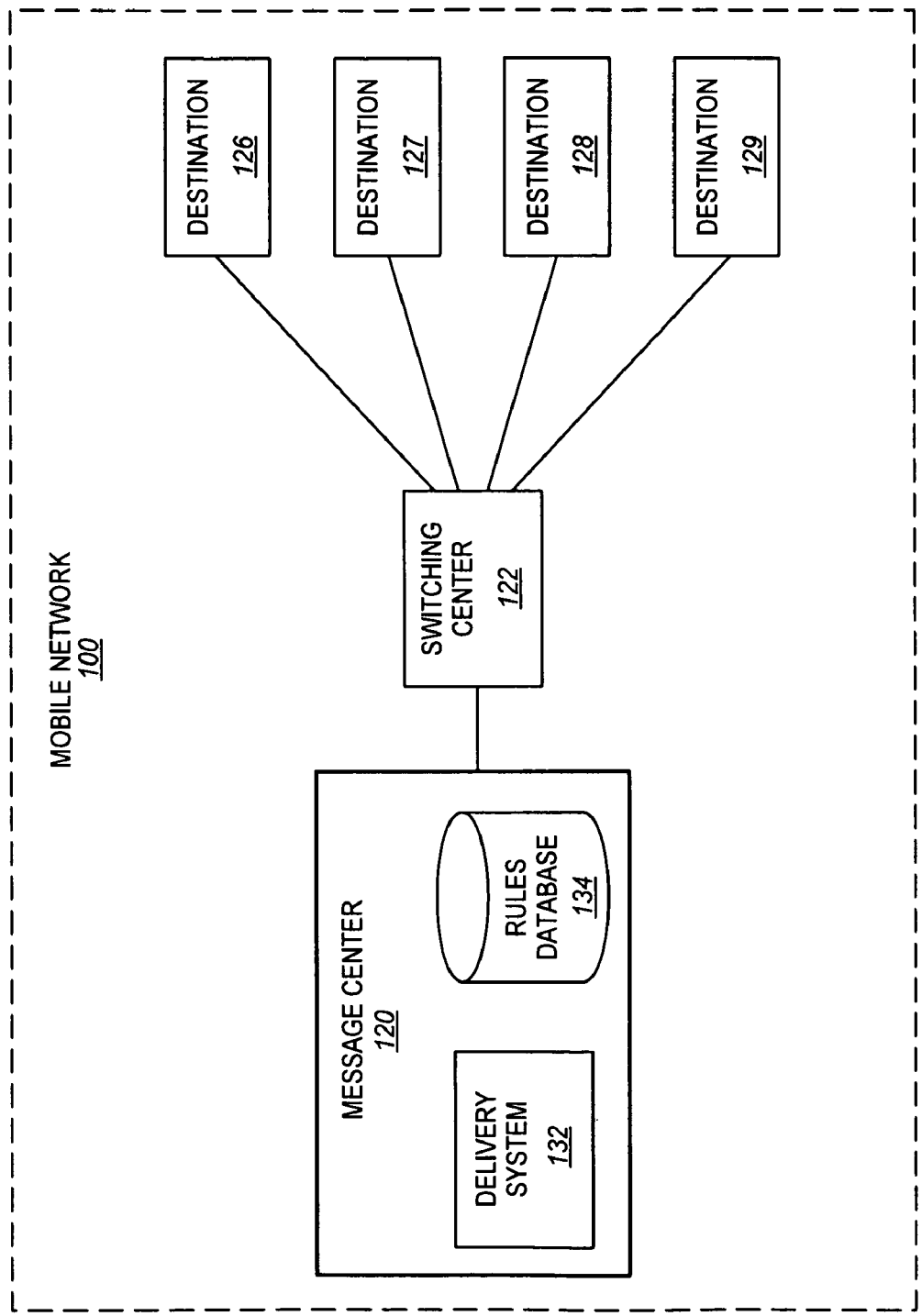
FIG. 1 illustrates a mobile network in an exemplary embodiment.

FIG. 1 illustrates a mobile network 100 in an exemplary embodiment. Mobile network 100 is able to facilitate the transfer of a text/multimedia message or some other type of message. The term "text/multimedia" means that the message may comprise a text message or a multimedia message. Although text/multimedia messages may be referenced in this embodiment, other types of messages may be used in other embodiments. Mobile network 100 includes a message center 120, a switching center 122, and a plurality of destinations 126-129. Those skilled in the art will appreciate that mobile network 100 may include multiple message centers, multiple switching centers, and many more destinations. Although not specifically shown in FIG. 1, those skilled in the art will appreciate that message center 120, switching center 122, and destinations 126-129 are connected through signaling links, such as SS7 signaling links.

Message center 120 comprises any network element operable to handle the delivery of text/multimedia messages. For example, message center 120 may comprise an SMSC that implements SMS protocol to deliver text or SMS messages. In another example, message center 120 may comprise an MMSC that implements MMS protocol to deliver multimedia or MMS messages. Message center 120 includes a delivery system 132 and a rules database 134. Delivery system 132 comprises any device, component, system, or application operable to attempt delivery of messages to destinations 126-129. As one example, delivery system 132 may include a store-and-forward system utilizing SMS protocol or another type of store-and-forward protocol. Rules database 134 comprises any storage system operable to store rules or policies defining how message delivery is limited to destination point codes. The rules may define how first delivery attempts and retry attempts are handled towards destinations 126-129. A first delivery attempt refers to the initial attempt performed upon receipt of the message. A retry attempt refers to a delivery attempt performed after the initial delivery attempt has failed.

Switching center 122 comprises any network element operable to route text/multimedia messages between message center 120 and destinations 126-129. One example of switching center 122 is a Mobile Switching Center (MSC). Destinations 126-129 comprise any signaling end points within mobile network 100. A destination does not necessarily refer to the end recipient of a text/multimedia message, such as a mobile phone. Text/multimedia messages are sent in signaling messages, and the signaling messages are routed within mobile network 100 using a routing label. The routing label includes an originating point code and a destination point code. The destination point code is an address or identifier within mobile network 100 that uniquely identifies a signaling end point for a message, which may be an intermediate element between the original sender of the message and the recipient of the message. Thus, destinations 126-129 are signaling end points identified by a destination point code. Some examples of destinations 126-129 are other message centers or other switching centers. For example, in a CDMA/GSM network, destinations 126-129 may comprise an MSC or SMSC.

In the embodiments described below, message center 120 is able to limit the number of text/multimedia messages (referred to herein generally as "messages") delivered to destinations. When message center 120 determines that there is traffic congestion for a destination, message center 120 dynamically adjusts delivery of messages toward the destination so that the number of messages delivered to the destination are limited. At the same time, message center 120 allows delivery of messages to the other destinations to continue as normal.

FIG. 2 is a flow chart illustrating a method 200 of identifying traffic congestion per destination in an exemplary embodiment. The steps of method 200 will be described with reference to mobile network 100 in FIG. 1, but those skilled in the art will appreciate that method 200 may be performed in other networks and systems. Also, the steps of the flow charts provided herein are not all inclusive and may include other steps not shown. The steps may be performed in an alternative order.

In step 202, switching center 122 monitors the amount of message traffic routed to destinations 126-129 in mobile network 100. If the message traffic routed to a destination (assume destination 126) exceeds a threshold, then switching center 122 generates a traffic message indicating traffic congestion for the destination 126 in step 204. When generating the traffic message, switching center 122 may identify a cause code, and insert the cause code in the traffic message. The cause code is defined to indicate congestion or an overload for destination 126. In step 206, switching center 122 transmits the traffic message to message center 120. The traffic message is intended to cause message center 120 to limit the number of messages sent to destination 126.

FIG. 3 is a flow chart illustrating a method 300 of adjusting delivery of messages based on destination point codes in an exemplary embodiment. The steps of method 300 will be described with reference to mobile network 100 in FIG. 1, but those skilled in the art will appreciate that method 300 may be performed in other networks and systems.

In step 302, delivery system 132 within message center 120 receives the traffic message from switching center 122 indicating traffic congestion for destination 126. In step 304, delivery system 132 processes the traffic message to identify a destination point code for destination 126. In one embodiment, switching center 122 may include a transaction identifier (ID) in the traffic message along with a cause code indicating a failed delivery. Delivery system 132 may thus process the transaction identifier and information stored in a message cache to identify the destination point code for destination 126. In other embodiments, switching center 122 may actually include the destination point code in the traffic message. In step 306, delivery system 132 adjusts delivery of messages toward the destination point code of destination 126. Thus, if a message is initially received for destination 126, then delivery system 132 may adjust the first delivery attempt of the message to destination 126. If a retry attempt is queued for destination 126, then delivery system 132 may adjust the retry attempt of the message to destination 126.

Although message delivery is adjusted based on destination point codes in this embodiment and other embodiments provided herein, the same concept applies to other destination identifiers that are used for routing signaling messages. For example, a destination may be identified by a global title. Thus, delivery system 132 may process a traffic message to identify a global title for destination 126 (see step 304), and adjust delivery of messages toward the global title of destination 126 (see step 306).

To determine how or when to adjust delivery of messages toward the destination point code of destination 126, delivery system 132 processes rules defined in rules database 134. The rules define how message delivery is limited to a destination point code or another destination identifier, such as a global title. For example, the rules may define that first delivery attempts of messages are queued for a time interval to delay the first delivery attempts. In response to initially receiving a message, delivery system 132 may process the rules to identify the time interval for delay, and then queue the message for the time interval before initiating the first delivery attempt.

The rules may define that the retry intervals are increased. For example, the time interval between the first delivery attempt and the first retry attempt may be increased. Likewise, the time interval between the first retry attempt and the second retry attempt may be increased even further, and so on. In another example, destination point codes identified as international point codes may have a longer retry interval than domestic point codes.

The rules may define that a percentage of the messages are selectively delivered based on a variety of factors. The percentage of messages delivered may be 0%, 10%, 20%, 30%, 40%, etc. One factor may be the type of message, such as SMS, Enhanced Message Service (EMS), Virtual Mobile Number (VMN), Wireless Application Protocol (WAP), broadcasting, emergency, priority, etc. Another factor may be the source address types, such as Mobile Originated (MO) or External Short Message Entities (ESME). Another factor may be the billing identifier or the billing type, such as pre-paid or post paid. Delivery system 132 will select the percentage of the messages authorized to be sent to destination 126, and either store or discard the rest.

Figure 4:
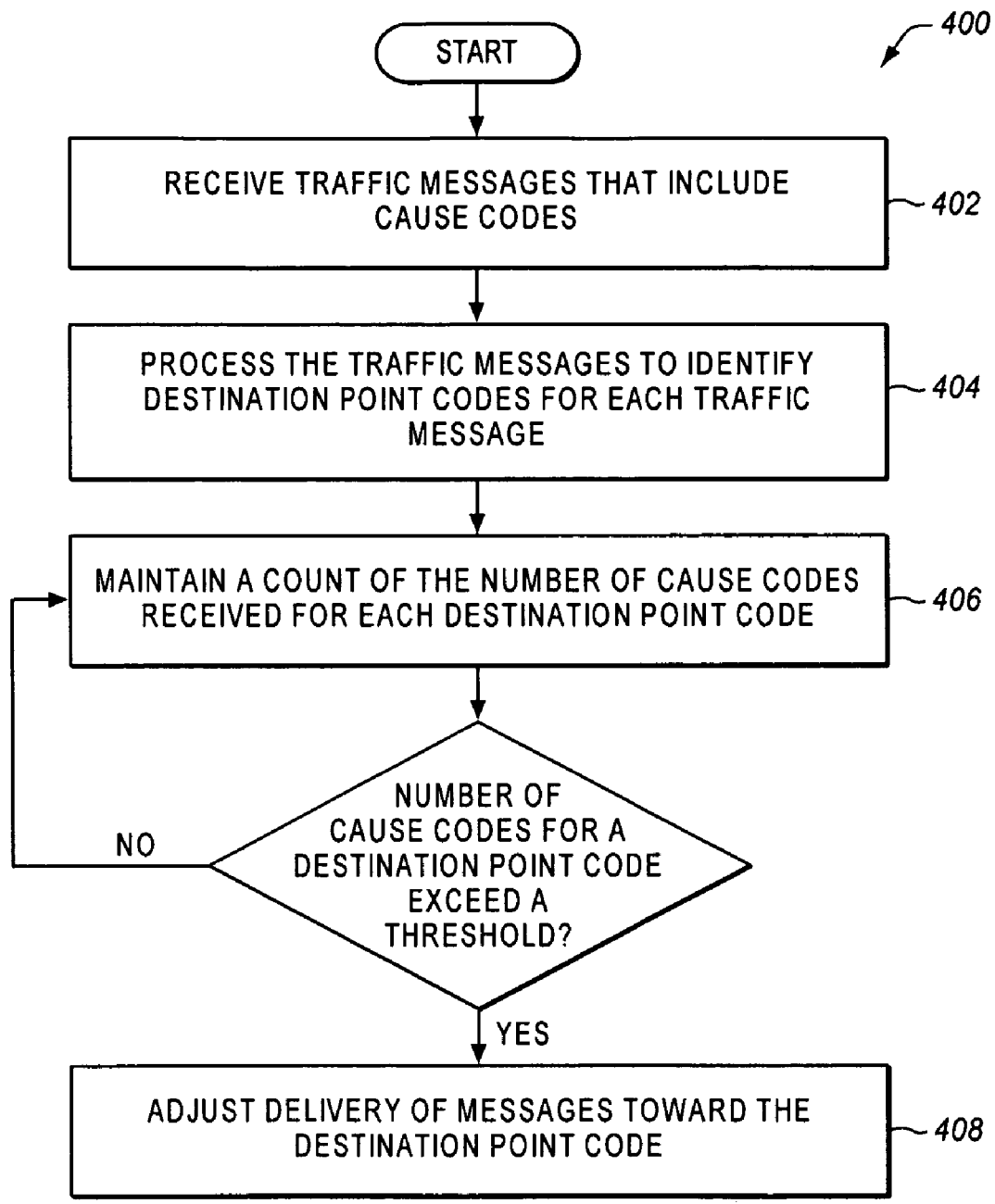
FIG. 4 is a flow chart further clarifying another method of adjusting delivery of messages based on destination point codes in an exemplary embodiment.

Delivery system 132 may not trigger the adjustment of message delivery upon receipt of a single traffic message from switching center 122. Delivery system 132 may actually receive multiple traffic messages from switching center 122 and/or other switching centers (not shown in FIG. 1), each of them including a cause code indicating congestion in some part of mobile network 100. FIG. 4 is a flow chart further clarifying a method 400 of adjusting delivery of messages based on destination point codes in an exemplary embodiment. In step 402, delivery system 132 receives multiple traffic messages that include cause codes. In step 404, delivery system 132 processes the traffic messages to identify destination point codes for each traffic message. In step 406, delivery system 132 maintains a count of the number of cause codes received for each destination point code during a time period. If the number of cause codes for a destination point code exceeds a threshold, then delivery system 132 identifies that the destination point code is experiencing congestion. Consequently, delivery system 132 adjusts delivery of messages toward the destination point code in step 408, such as by processing the rules in rules database 134. Delivery system 132 does this for each destination point code that exceeds the threshold. Thus, delivery system 132 limits delivery of messages for each destination point code that is experiencing congestion. At the same time, delivery system 132 may maintain regular message delivery to the destination point codes that are not experiencing congestion.

The threshold used by delivery system 132 to identify destination point codes that are experiencing congestion may vary depending on a variety of factors. For example, delivery system 132 may dynamically define the threshold based on time of day, day of the week, or day of the year. Delivery system 132 may also dynamically define the threshold based on other network parameters, such as subscriber numbers, percentage of EMS messages versus SMS message, etc.

EXAMPLE

Figure 5:
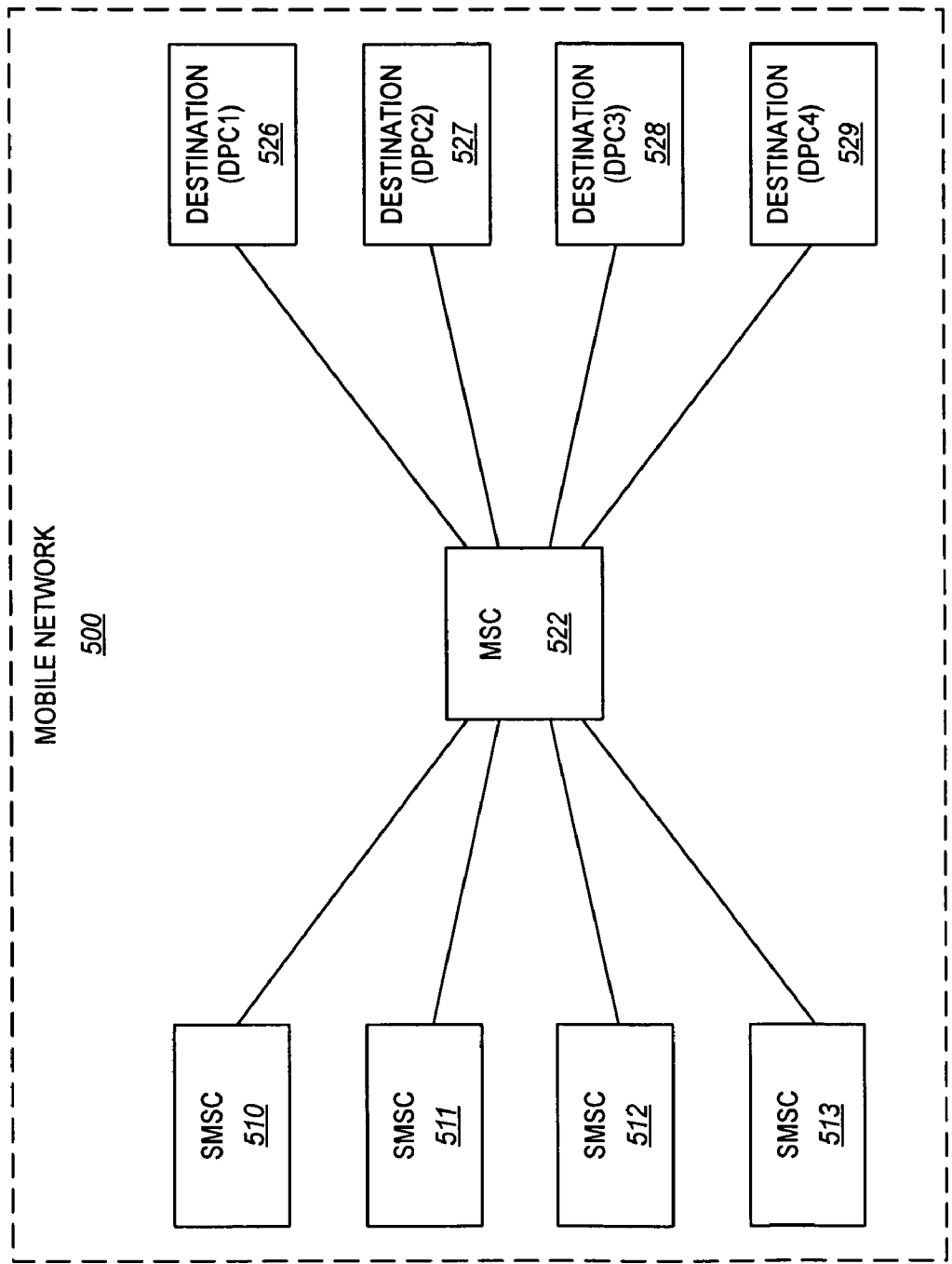
FIG. 5 illustrates a mobile network in another exemplary embodiment.

FIG. 5 illustrates a mobile network 500 in another exemplary embodiment. Mobile network 500 is able to facilitate the transfer of SMS messages. In this embodiment, mobile network 500 includes a plurality of SMSCs 510-513, an MSC 522, and a plurality of destinations 526-529. Although not specifically shown in FIG. 5, those skilled in the art will appreciate that SMSCs 510-513, MSC 522, and destinations 126-129 are connected through signaling links, such as SS7 signaling links.

Figure 6:
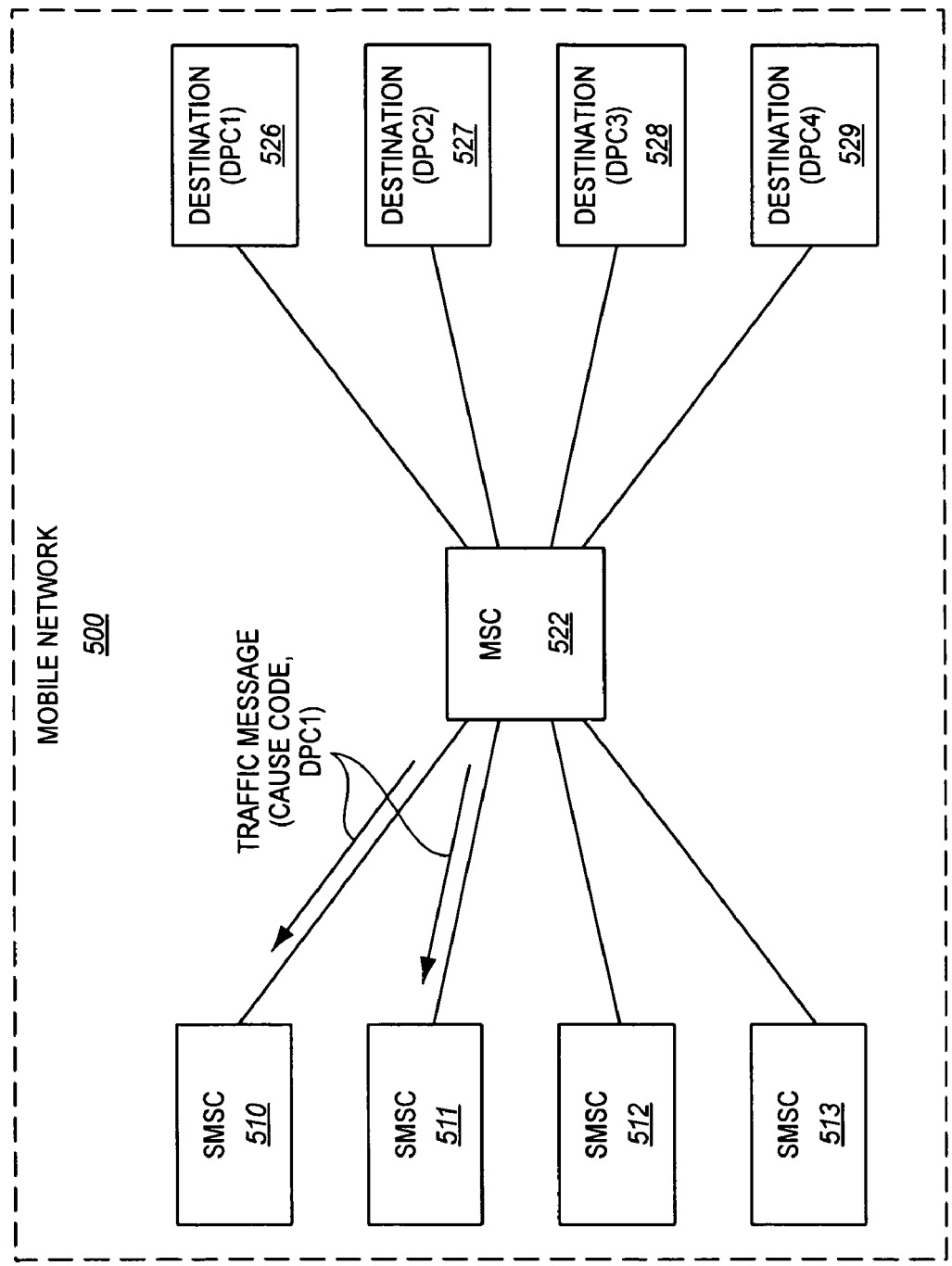
FIG. 6 illustrates an MSC transmitting traffic messages to SMSCs in an exemplary embodiment.

When in operation, each SMSC 510-513 delivers SMS messages to MSC 522. Also, MSC 522 forwards the SMS messages to destinations 526-529 based on routing labels in the SMS messages. Each destination 526-529 has a unique destination point code for routing. For example, destination 526 has a destination point code of DPC1, destination 527 has a destination point code of DPC2, etc. While forwarding the SMS messages, MSC 522 monitors the amount of message traffic routed to destinations 526-529. If the message traffic routed to a destination (assume destination 526) exceeds a threshold, then MSC 522 generates traffic messages indicating traffic congestion for destination 526. MSC 522 identifies a cause code indicating the traffic congestion, and inserts the cause code and the destination point code (DPC1) for destination 526 in the traffic messages. MSC 522 then transmits the traffic messages to SMSC 510 and 511. FIG. 6 illustrates MSC 522 transmitting the traffic messages to SMSCs 510-511 in an exemplary embodiment. MSC 522 may additionally transmit traffic messages to SMSCs 512-513 depending on the desired configuration.

In FIG. 6, SMSC 510 receives the traffic message from MSC 522 indicating traffic congestion for DPC1. SMSC 510 may also receive additional traffic messages from MSC 522 and other MSCs not shown in FIG. 6. SMSC 510 processes the traffic messages to identify destination point codes for each traffic message. SMSC 510 maintains a count of the number of cause codes received for each destination point code during a time period. If the number of cause codes for a destination point code (e.g., DPC1) exceeds a threshold, then SMSC 510 identifies that DPC1 is experiencing congestion. Consequently, SMSC 510 adjusts delivery of SMS messages toward DPC1 to limit the number of SMS messages delivered to DPC1. Thus, when an SMS message for DPC1 is first received or an SMS message for DPC1 is scheduled for a retry attempt, SMSC 510 processes rules to determine when or if to attempt the delivery of the SMS message. For example, the rules may define that a first delivery attempt of an SMS message is queued for a time interval to delay the first delivery attempt. The rules may define that retry intervals for SMS messages are increased. The rules may define that a percentage of the SMS messages are selectively delivered based on a variety of factors. SMSC 511 operates in a similar manner to adjust delivery of SMS messages to DPC1.

Figure 7:
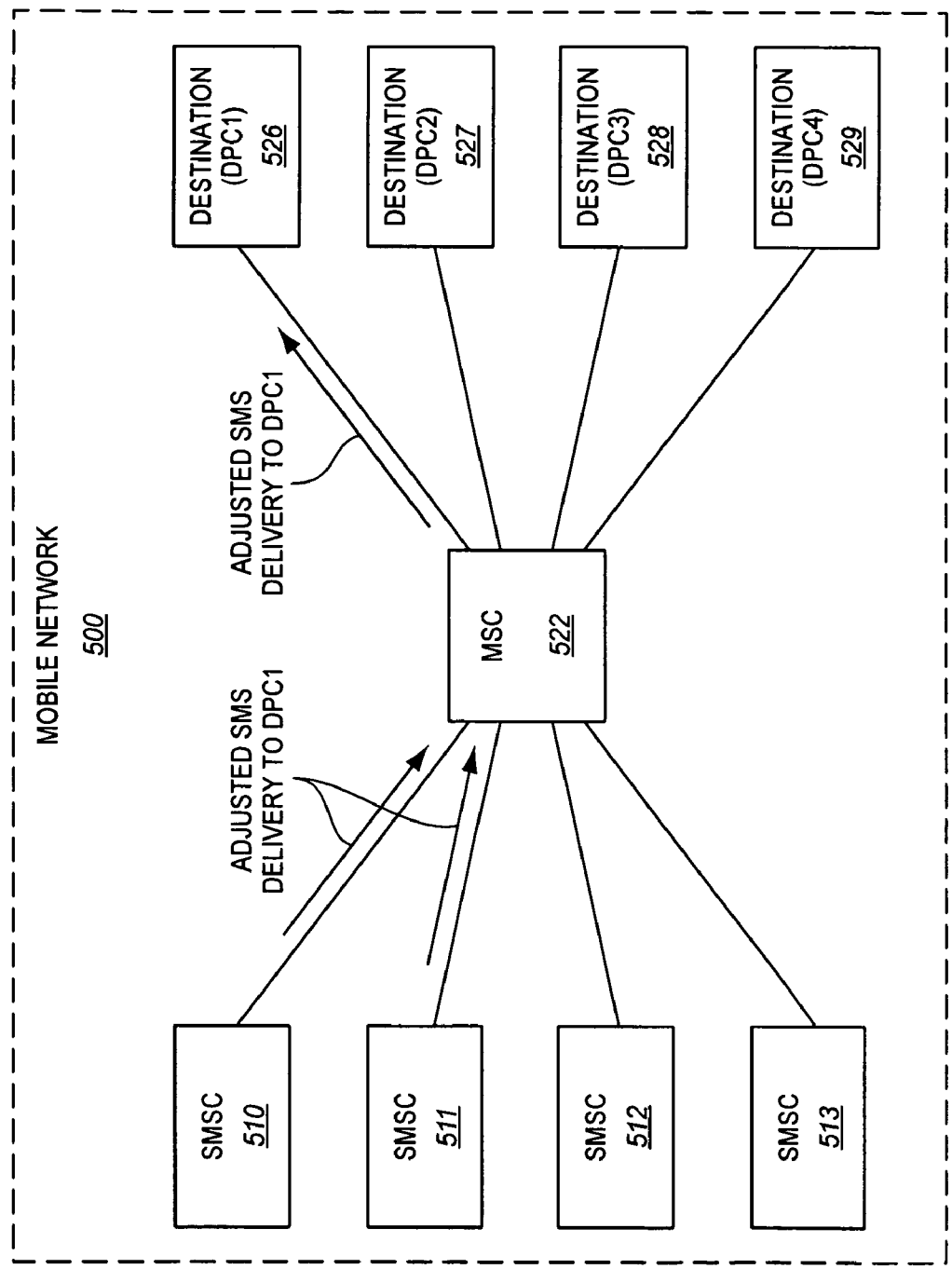
FIG. 7 illustrates SMSCs limiting the number of SMS messages delivered to a destination point code (DPC1) in an exemplary embodiment.

FIG. 7 illustrates SMSCs 510-511 limiting the number of SMS messages delivered to DPC1 in an exemplary embodiment. Due to the congestion for DPC1, both SMSC 510 and SMSC 511 adjust delivery of SMS messages to DPC1. The SMS messages forwarded to DPC1 from MSC 522 will also be adjusted. Because the number of SMS messages delivered to DPC1 is limited during a time period, the congestion experienced by destination 526 may be alleviated. At the same time, SMSCs 510-513 may maintain regular message delivery to DPC2, DPC3, and DPC4. Thus, the service to these destinations 527-529 are unaffected by the congestion of destination 526.

Figure 8:
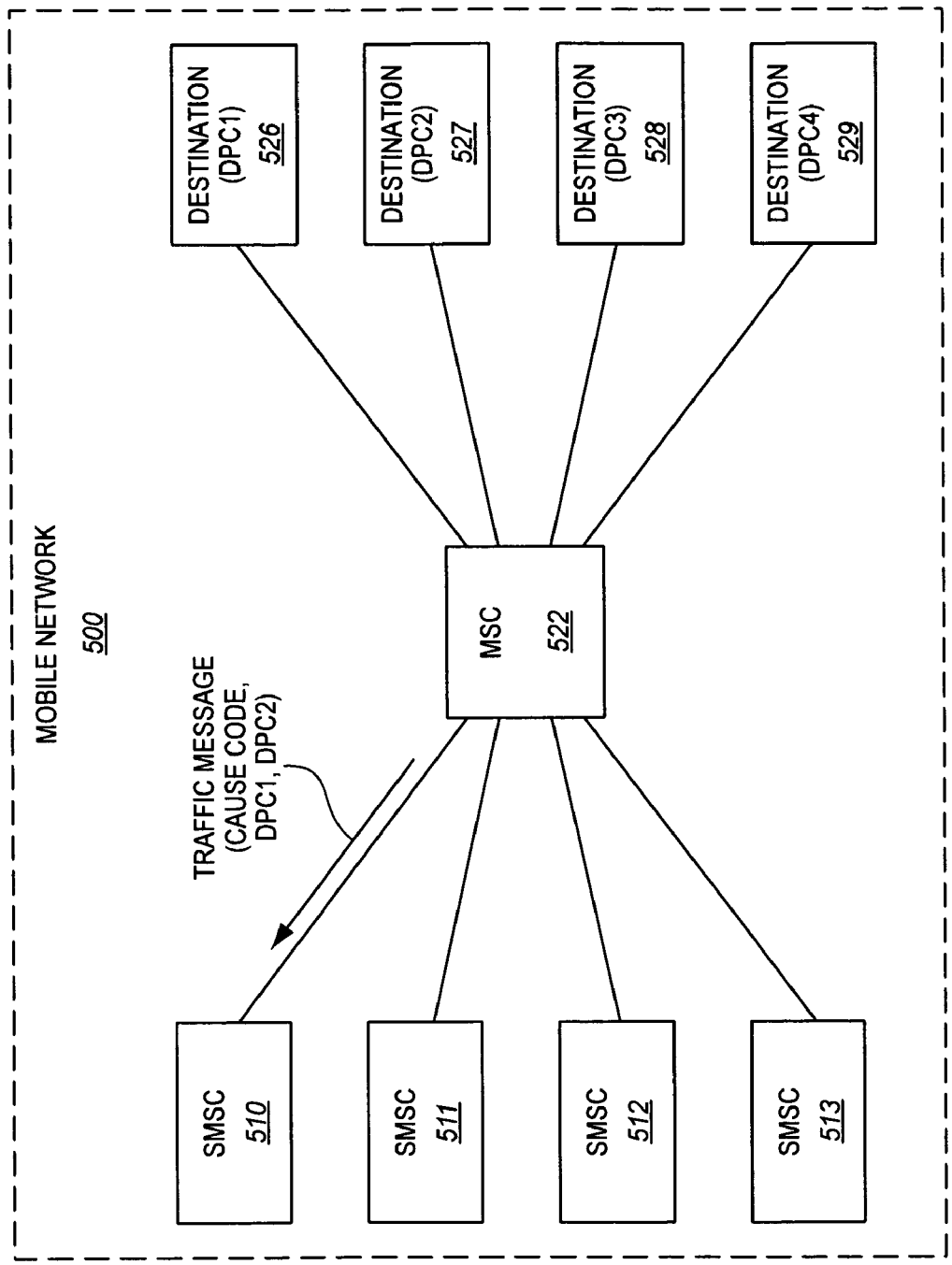
FIG. 8 illustrates an MSC transmitting a traffic message to an SMSC in an exemplary embodiment.

Assume for another example that MSC 522 identifies congestion for destinations 526 and 527. MSC 522 generates a traffic message indicating traffic congestion for destinations 526-527. MSC 522 identifies a cause code indicating the traffic congestion, and inserts the cause code and the destination point codes (DPC1 and DPC2) for destinations 526-527 in the traffic message. MSC 522 then transmits the traffic message to SMSC 510. FIG. 8 illustrates MSC 522 transmitting the traffic message to SMSC 510 in an exemplary embodiment. MSC 522 may additionally transmit the traffic message to SMSCs 511-513 depending on the desired configuration.

In FIG. 8, SMSC 510 receives the traffic message from MSC 522 indicating traffic congestion for DPC1 and DPC2. SMSC 510 may also receive additional traffic messages from MSC 522 and other MSCs not shown in FIG. 8. SMSC 510 processes the traffic messages to identify destination point codes for each traffic message. SMSC 510 maintains a count of the number of cause codes received for each destination point code during a time period. If the number of cause codes for one or more destination point codes (e.g., DPC1 and DPC2) exceeds a threshold, then SMSC 510 identifies that DPC1 and DPC2 are experiencing congestion. Consequently, SMSC 510 adjusts delivery of SMS messages toward DPC1 and DPC2 to limit the number of SMS messages delivered to these destination point codes.

Figure 9:
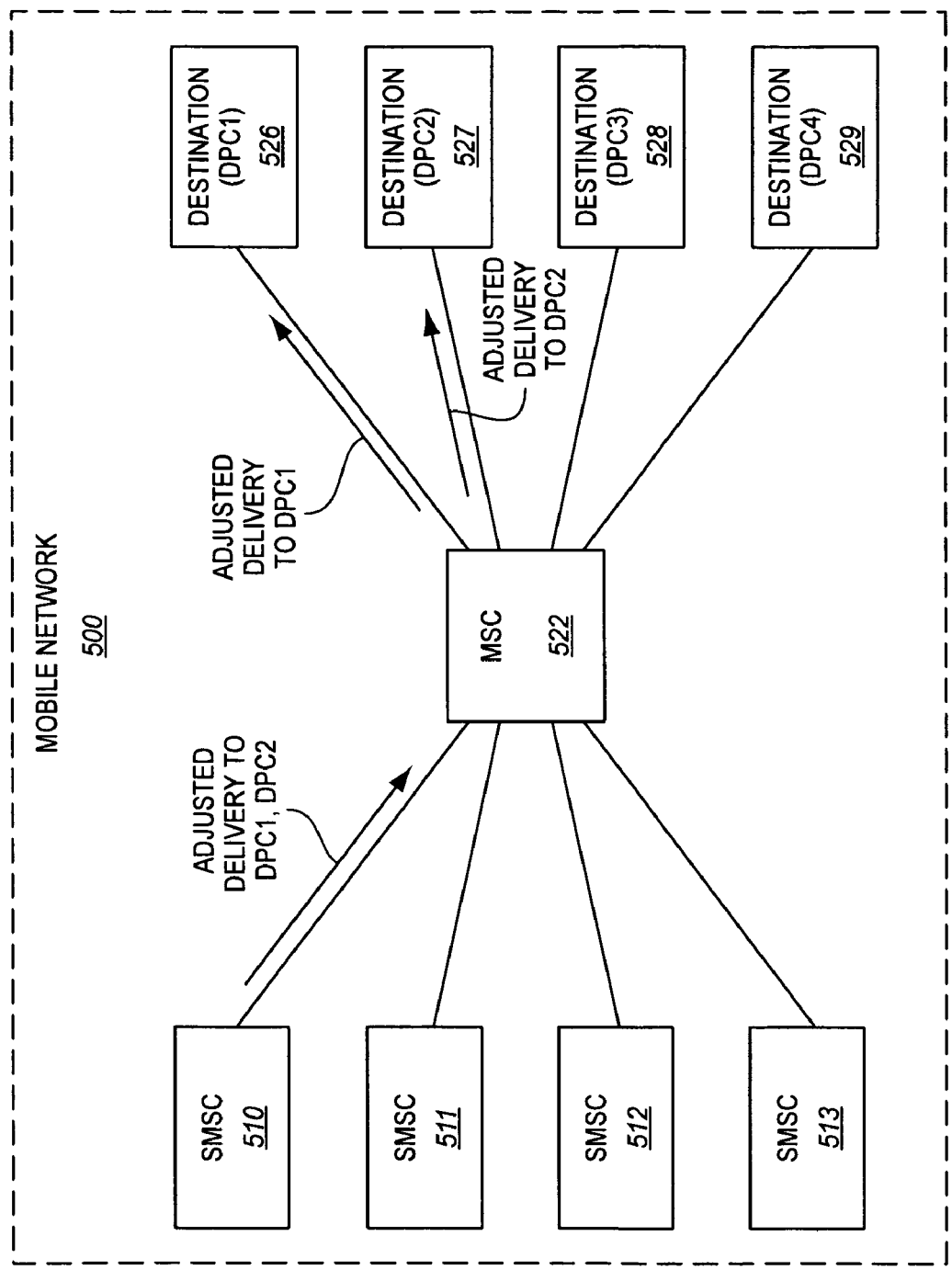
FIG. 9 illustrates an SMSC limiting the number of SMS messages delivered to destination point codes (DPC1 and DPC2) in an exemplary embodiment.

FIG. 9 illustrates SMSC 510 limiting the number of SMS messages delivered to DPC1 and DPC2 in an exemplary embodiment. Due to the congestion for DPC1 and DPC2, SMSC 510 adjusts delivery of SMS messages to DPC1 and DPC2. The SMS messages forwarded to DPC1 and DPC2 from MSC 522 will also be adjusted. Because the number of SMS messages delivered to DPC1 and DPC2 is limited during a time period, the congestion experienced by destinations 526-527 may be alleviated. At the same time, SMSCs 510-513 may maintain regular message delivery to DPC3 and DPC4. Thus, the service to these destinations 528-529 are unaffected by the congestion of destinations 526-527.

In addition to counting the number of cause codes received per DPC, SMSCs 510-513 may additionally count the number of cause codes received per MSC 522. Thus, SMSCs 510-513 may adjust delivery of SMS messages based on DPCs and based on MSCs.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A system comprising:
a message center operable to handle text/multimedia messages within a mobile network, the message center comprising:
a rules database operable to store rules defining how delivery of text/multimedia messages is limited to destination point codes when traffic congestion is identified for destinations in the mobile network; and
a delivery system operable to receive a traffic message from a switching center of the mobile network indicating traffic congestion for a destination, to process the traffic message to identify a destination point code for the destination, and to adjust delivery of the text/multimedia messages toward the destination point code based on the rules stored in the rules database by:
adjusting a first delivery attempt of a text/multimedia message toward the destination point code; and
adjusting one or more retry attempts of the text/multimedia message toward the destination point code.

2. The system of claim 1 wherein:
the delivery system is further operable to receive multiple traffic messages that include cause codes, to process the traffic messages to identify destination point codes for each traffic message, and to maintain a count of the number of cause codes received for each destination point code during a time period;
if the number of cause codes for a destination point code exceeds a threshold, then the delivery system is further operable to adjust delivery of the text/multimedia messages toward the destination point code based on the rules stored in the rules database.

3. The system of claim 2 wherein:
the delivery system is further operable to dynamically define the threshold based on time of day.

4. The system of claim 2 wherein:
the delivery system is further operable to dynamically define the threshold based on day of the week.

5. The system of claim 2 wherein:
the delivery system is further operable to queue first delivery attempts for the text/multimedia messages toward the destination point code for a time interval to delay the first delivery attempts.

6. The system of claim 2 wherein:
the delivery system is further operable to increase retry intervals for the text/multimedia messages toward the destination point code.

7. The system of claim 2 wherein:
the delivery system is further operable to selectively deliver a percentage of the text/multimedia messages toward the destination point code.

8. A method comprising:
storing rules defining how delivery of text/multimedia messages is limited to destination point codes when traffic congestion is identified for destinations in the mobile network;
receiving a traffic message indicating traffic congestion for a destination;
processing the traffic message to identify a destination point code for the destination; and
adjusting delivery of the text/multimedia messages toward the destination point code based on the stored rules by:
  adjusting a first delivery attempt of a text/multimedia message toward the destination point code; and
  adjusting one or more retry attempts of the text/multimedia message toward the destination point code.

9. The method of claim 8 further comprising:
receiving multiple traffic messages that include cause codes;
processing the traffic messages to identify destination point codes for each traffic message;
maintaining a count of the number of cause codes received for each destination point code during a time period; and
if the number of cause codes for a destination point code exceeds a threshold, then adjusting delivery of text/multimedia messages toward the destination point code based on the store rules.

10. The method of claim 9 further comprising:
dynamically defining the threshold based on time of day.

11. The method of claim 9 further comprising:
dynamically defining the threshold based on day of the week.

12. The method of claim 9 wherein adjusting delivery of text/multimedia messages toward the destination point code comprises:
  queuing first delivery attempts for the text/multimedia messages toward the destination point code for a time interval to delay the first delivery attempts.

13. The method of claim 9 wherein adjusting delivery of text/multimedia messages toward the destination point code comprises:
  increasing retry intervals for the text/multimedia messages toward the destination point code.

14. The method of claim 9 wherein adjusting delivery of text/multimedia messages toward the destination point code comprises:
  selectively delivering a percentage of the text/multimedia messages toward the destination point code.

15. A mobile network comprising:
a switching center operable to monitor the amount of text/multimedia message traffic that is routed to destinations in the mobile network;
if the text/multimedia message traffic routed to a destination exceeds a first threshold, then the switching center is further operable to generate a traffic message indicating traffic congestion for the destination, and to transmit the traffic message to a message center; and
the message center operable to store rules defining how delivery of text/multimedia messages is limited to destination point codes when traffic congestion is identified for destinations in the mobile network;
the message center is further operable to receive the traffic message from the switching center, to process the traffic message to identify a destination point code for the destination, and to adjust delivery of the text/multimedia messages toward the destination point code based on the rules by:
  adjusting a first delivery attempt of a text/multimedia message toward the destination point code; and
  adjusting one or more retry attempts of the text/multimedia message toward the destination point code.

16. The mobile network of claim 15 wherein:
the switching center is further operable to identify a cause code responsive to identifying the text/multimedia message traffic to the destination exceeding the first threshold, and to insert the cause code in the traffic message.

17. The mobile network of claim 16 wherein:
the message center is further operable to receive the traffic message from the switching center and other traffic messages that include cause codes, to process the traffic messages to identify destination point codes for each traffic message, and to maintain a count of the number of cause codes received for each destination point code during a time period;
if the number of cause codes for a destination point code exceeds a second threshold, then the message center is further operable to adjust delivery of text/multimedia messages toward the destination point code.

18. The mobile network of claim 15 wherein:
the message center is further operable to queue first delivery attempts for the text/multimedia messages toward the destination point code for a time interval to delay the first delivery attempts.

19. The mobile network of claim 15 wherein:
the message center is further operable to increase retry intervals for the text/multimedia messages toward the destination point code.

20. The mobile network of claim 15 wherein:
the message center is further operable to selectively deliver a percentage of the text/multimedia messages toward the destination point code.

* * * * *